(12) United States Patent
White, Jr.

(10) Patent No.: US 9,970,743 B2
(45) Date of Patent: May 15, 2018

(54) ATTACHABLE RETAINER FOR A TAPE MEASURE

(71) Applicant: Willie Oscar White, Jr., Pleasant Garden, NC (US)

(72) Inventor: Willie Oscar White, Jr., Pleasant Garden, NC (US)

( * ) Notice: Subject to any disclaimer, the term of this patent is extended or adjusted under 35 U.S.C. 154(b) by 112 days.

(21) Appl. No.: 15/177,837

(22) Filed: Jun. 9, 2016

(65) Prior Publication Data
US 2017/0074632 A1 Mar. 16, 2017

Related U.S. Application Data

(60) Provisional application No. 62/218,709, filed on Sep. 15, 2015.

(51) Int. Cl.
*G01B 3/10* (2006.01)

(52) U.S. Cl.
CPC .... *G01B 3/1056* (2013.01); *G01B 2003/1076* (2013.01)

(58) Field of Classification Search
CPC .................. G01B 3/1056; G01B 2003/1076
USPC .......................................... 33/770, 757, 758
See application file for complete search history.

(56) References Cited

U.S. PATENT DOCUMENTS

| | | | | |
|---|---|---|---|---|
| 1,599,852 A | * | 9/1926 | Thomas | G01B 3/1071 33/485 |
| 2,976,614 A | * | 3/1961 | Matuszewski | G01B 3/1071 33/27.03 |
| 4,103,426 A | * | 8/1978 | Robin | B43L 9/045 33/27.03 |
| 5,458,946 A | * | 10/1995 | White, Jr. | G01B 3/1071 220/229 |
| 5,481,813 A | * | 1/1996 | Templeton | G01B 3/1071 33/758 |
| 5,542,184 A | * | 8/1996 | Beard | B26B 29/06 30/293 |
| 5,782,007 A | * | 7/1998 | Harris | B26B 29/06 33/27.03 |
| 7,487,600 B1 | * | 2/2009 | Cooper | G01B 3/1056 33/770 |
| 8,402,671 B1 | * | 3/2013 | Marhold | G01B 3/1071 33/1 LE |
| 8,832,958 B2 | * | 9/2014 | Mabey | G01B 3/1005 33/758 |
| 2002/0011008 A1 | * | 1/2002 | Nelson | G01B 3/1056 33/770 |

(Continued)

*Primary Examiner* — Christopher Fulton
(74) *Attorney, Agent, or Firm* — Dunlap Bennett & Ludwig PLLC

(57) ABSTRACT

An attachable retainer for mounting on the L-shaped catch assembly of flexible tape is provided. The attachable retainer provides a pear-shaped base plate having peripheral sidewalls defining a lower holding area for receiving flimsy workpieces that would not afford sufficient resistance needed to extend the flexible tape relative to its housing. A curved opening in the base plate receives the catch assembly, while two prongs and a horizontal brace over the curved opening and a tongue element just below the curved opening removably secure the catch assembly. A plurality of teeth provided by the sidewalls enable the attachment retainer to be used on conventional and unconventional workpieces without the need to remove the attachable retainer.

5 Claims, 3 Drawing Sheets

(56) References Cited

U.S. PATENT DOCUMENTS

2004/0049939 A1* 3/2004 Rafter .................. G01B 3/1071
33/770
2012/0073155 A1* 3/2012 Mabey ................. G01B 3/1005
33/770

* cited by examiner

ATTACHABLE RETAINER FOR A TAPE MEASURE

CROSS-REFERENCE TO RELATED APPLICATION

This application claims the benefit of priority of U.S. provisional application No. 62/218,709, filed 15 Sep. 2015, the contents of which are herein incorporated by reference.

BACKGROUND OF THE INVENTION

The present invention relates to attachments for flexible tapes and more particularly to a cap-like retainer adapted to removably attach to the distal end of a flexible tape.

Flexible tape, particularly the type designed to be extendable and retractable from a housing is commonly referred to as retractable tape. Typically, retractable tape terminates in an L-shaped end catch that generally extends at a right angle to the tape. This turned-down catch is very beneficial for assisting a person in measuring a distance especially where a starting or end point is such that the catch on the remote end of the tape can be effectively hooked and held stationary while the tape housing is pulled.

However, these hook-type attachments have many disadvantages and drawbacks in certain applications. For example, it can be difficult to properly measure unconventional members that either give way or are incapable of effectively hooking and holding stationary the turned-down catch. Consider the problem that a user has in measuring the length of a flimsy workpiece. When the user attempts to effectively hook the turned-down catch, the flimsy workpiece just gives way, not affording the user sufficient resistance to freely extend the flexible tape from the housing.

The prior art includes cap like retainers that may be mounted to the turned-down catch for taking the measure of a flimsy material that would otherwise give way. However, if the unconventional member is too large fit within the cap like retainer then accurate measurements can still be elusive. Furthermore, if there are multiple elements to measure, some are flimsy unconventional members and others can conventionally be hooked, but are too big to fit within the cap like retainer, then a user would need to waste the time to attach, detach, attach, etc., the prior cap like retainers.

As can be seen, there is a need for an attachable retainer that can be removably attached to the end of the flexible tape for taking the measure of an unconventional member that is both too flimsy to provide adequate resistance for retractable flexible tape and too large to be received inside a cap like retainer or measure a plurality of unconventional and conventional members without have to repeatedly attach and detach the cap like retainer.

SUMMARY OF THE INVENTION

In one aspect of the present invention, a cap-like retainer adapted to removably attach to the distal end of a flexible tape includes a pear-shaped base plate; a sidewall joined along a periphery of the base plate so as to define an upper and lower holding area; a curved opening provided by the base plate, wherein the curved opening communicates to the upper holding area, and wherein the curved opening is dimensioned to mimic the conventional bowed-shape of flexible tape; a tongue element below the curved opening, wherein the tongue element is movable between a planar condition and a protruding condition away from the upper holding area, wherein a periphery of the curved opening is greater in the protruding condition; two prongs provided by the base plate so as to extend along yet spaced apart from a substantial portion thereof, each prong eclipsing a separate portion of the curved opening; a horizontal brace extending between the two prongs, wherein the horizontal brace provides a fastener hole; and a plurality of teeth provided along a portion of the sidewall.

These and other features, aspects and advantages of the present invention will become better understood with reference to the following drawings, description and claims.

DETAILED DESCRIPTION OF THE INVENTION

Figure 1:
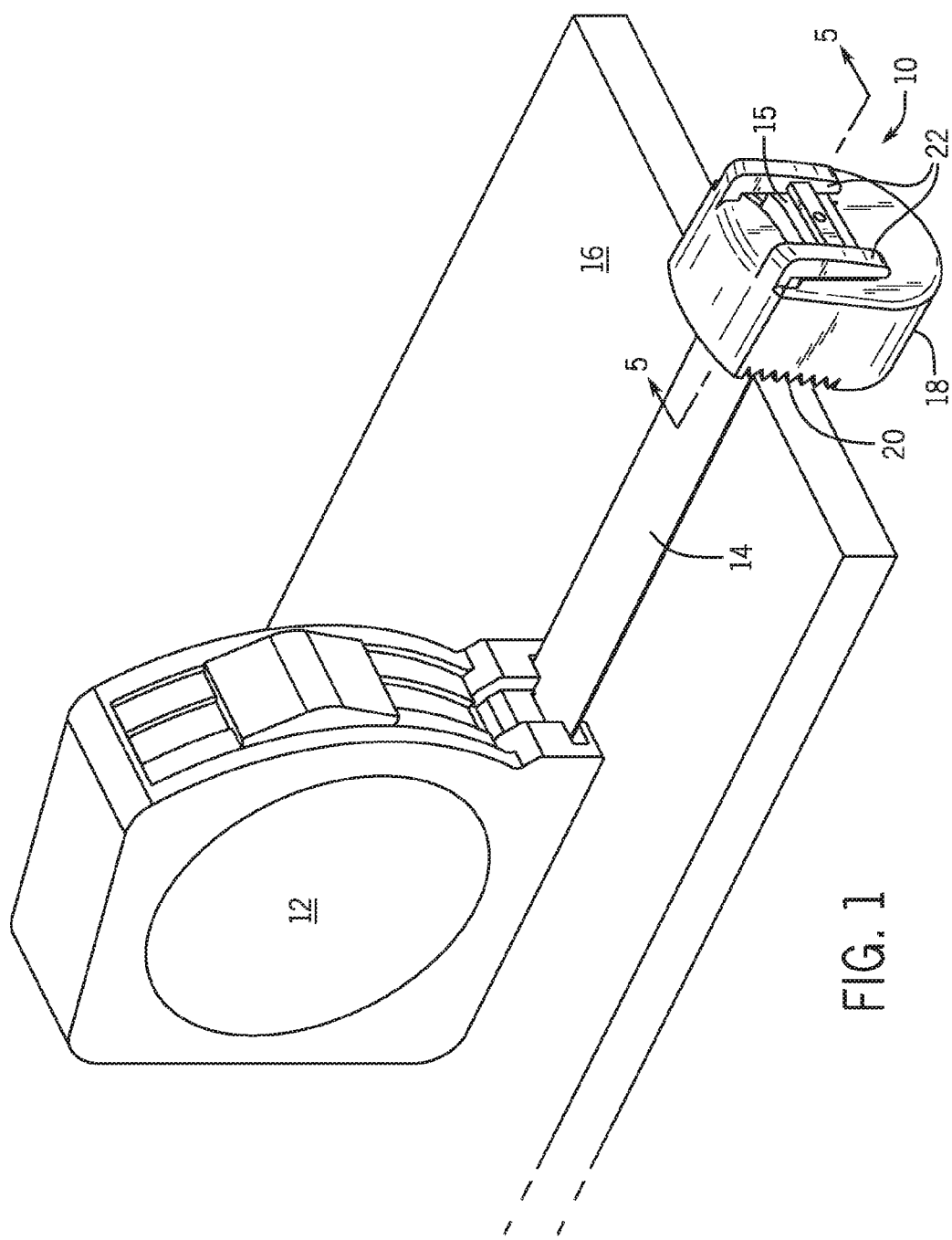
FIG. 1 is a perspective view of an exemplary embodiment of the present invention.
Figure 2:
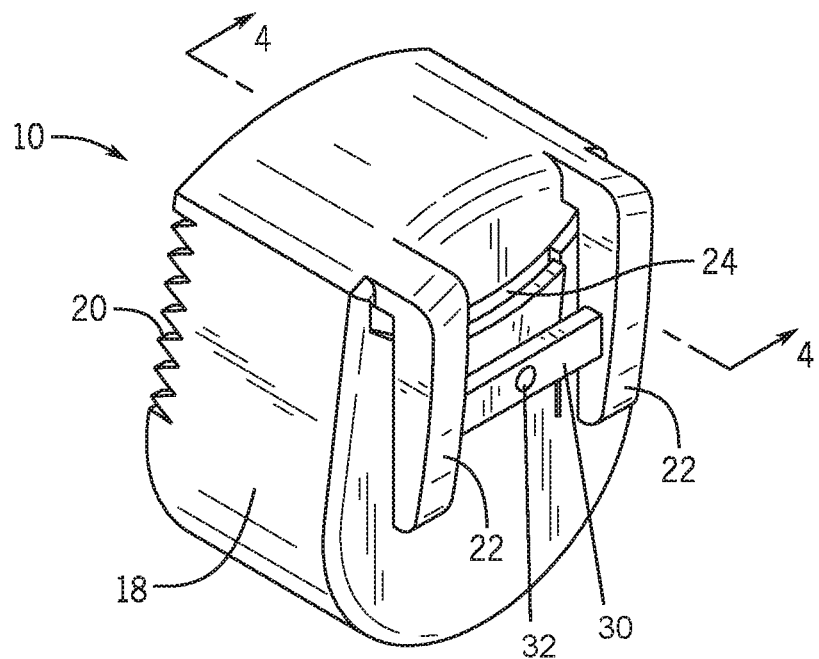
FIG. 2 is a front perspective view of an exemplary embodiment of the present invention.
Figure 3:
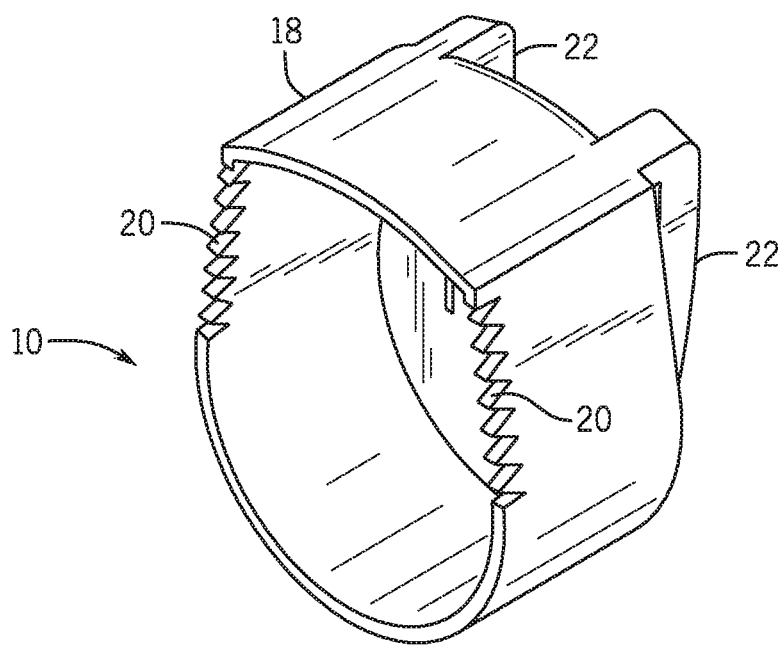
FIG. 3 is a rear perspective view of an exemplary embodiment of the present invention.
Figure 4:
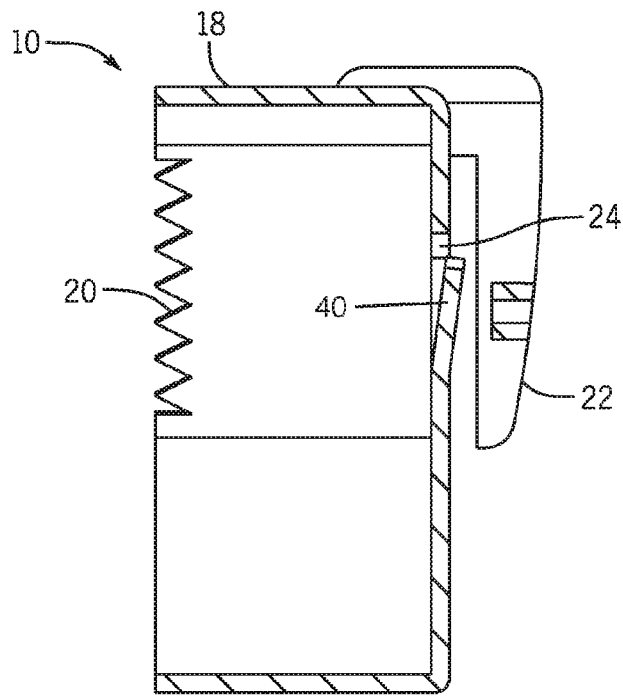
FIG. 4 is a cross-sectional view of an exemplary embodiment of the present invention, taken along line 4-4 of FIG. 2.
Figure 5:
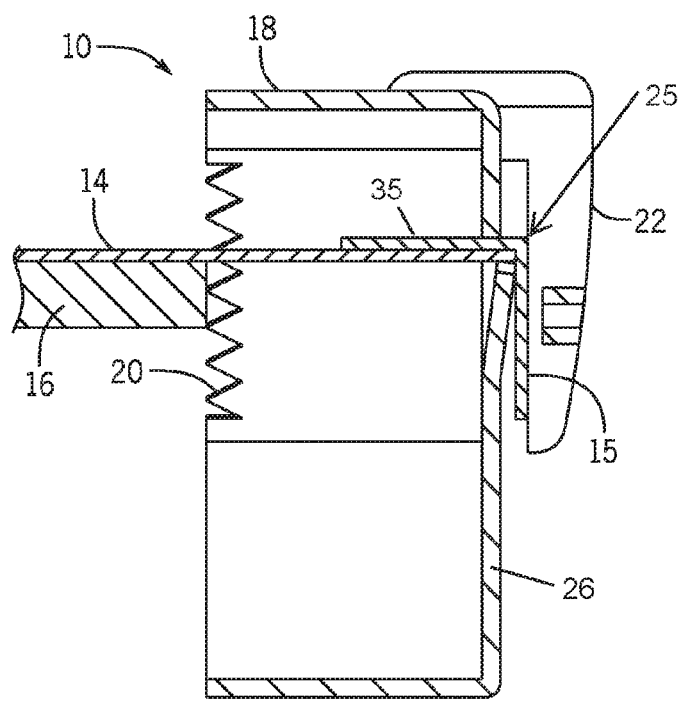
FIG. 5 is a cross-sectional view of an exemplary embodiment of the present invention, taken along line 5-5 of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an attachable retainer for mounting on the L-shaped catch assembly of flexible tape. The attachable retainer provides a pear-shaped base plate having peripheral sidewalls defining a lower holding area for receiving flimsy workpieces that would not afford sufficient resistance needed to extend the flexible tape relative to its housing. A curved opening in the base plate receives the catch assembly, while two prongs and a horizontal brace over the curved opening and a tongue element just below the curved opening removably secure the catch assembly. A plurality of teeth provided by the sidewalls enable the attachment retainer to be used on conventional and unconventional workpieces without the need to remove the attachable retainer.

Referring to FIGS. 1 through 5, the present invention may include an attachable retainer 10 for mounting on a distal end of flexible tape 14. The flexible tape 14 typically would be the type that retractably extends from a housing 12, wherein the distal end of the flexible tape 14 provides a conventional L-shaped catch assembly 25 having a leg portion 15 generally perpendicular to the longitudinal axis of the flexible tape 14 and a body portion 35 of the catch assembly that is typically planar with the distal end of the flexible tape 14.

The attachable retainer 10 includes a planar base plate 26 that in the case of this embodiment is pear-shaped. Sidewalls 18 are transversely provided along the periphery of the base plate 26, forming a pear-shaped cap like configuration so that the sidewalls 18 define a lower holding area more voluminous than an upper holding area, as illustrated in the Figures. Generally, the lower holding area is adapted to retain the flimsy workpiece 16 that would otherwise give way when just using the conventional catch assembly 25. The length of the sidewalls 18 consistently extend for a predetermined length. The attachable retainer 10 may be made of material that can be repeatedly bent without fracturing, such as polyethylene, polypropylene, various plasticized materials and the like.

A curved opening 24 is provided in the base plate 26, the curved opening 24 communicating with the upper holding area. The curved opening 24 is dimensioned and adapted to receive the leg portion 15 and then the body portion 35 of catch assembly 25. The curvature of the curved opening 24 is adapted to mimic the convention curvature of the flexible tape 14 of retractable tape measures, so that the curved opening 24 intolerantly grips the body portion 35 and the flexible tape connected thereto.

On the side of the base plate 26 opposite the sidewalls 18, two prongs 22 are provided spaced apart from the base plate 26, extending from the upper portion thereof, and over the curved opening 24 toward the lower portion, as illustrated in FIG. 1. The two prongs 22 are adapted to hold the received leg portion 15 in place. Moreover, a horizontal brace 30 may extend between the two prongs 22, wherein a brace hole 32 may be provided near the midpoint of the horizontal brace 30 so that a fastener may engage the received leg portion 15 through the brace hole 32.

A tongue 40 may be formed by the base plate 26 below the curved opening 26. The tongue 40 may be moveable between a planar condition and a protruding condition protruding toward the two prongs 22, as illustrated in in FIGS. 4 and 5. The protruding condition facilitates the reception of the catch assembly 25, while the planar condition reduces the receiving space between an upper edge and a lower edge of the curved opening 24, thereby further gripping the body portion 35 of the catch assembly 25.

The sidewall defining the upper portion, or at least a portion thereof, terminates in a plurality of teeth 20 adapted to hold thinner workpieces 16 that may be too large to otherwise fit inside the bottom portion to secure a measurement. Moreover, the teeth 20 may be adapted to bite into conventional workpieces 16 too large to fit within the lower holding area so that the attachable retainer 10 may be used on conventional workpieces 16 and unconventional workpieces 16 without having to detach and reattach the attachable retainer 10 along the way.

A method of using the present invention may include the following. The attachable retainer 10 disclosed above may be provided. The catch assembly 25 may be slid through the curved opening 24 so that the leg portion 15 thereof is between the two prongs 22 and the base plate 26. Then the user may then move the tongue 40 to the planar condition to securely engage the body portion 35 and/or use a fastener (not shown) through the brace hole 32 to securely engage the leg portion 15 of the flexible tape 14.

Once the retainer 10 has been attached to the distal end of the flexible tape 14, an unconventional workpiece 16 to be measured can be inserted into the lower holding area of the retainer 10 and the tape housing 12 pulled along the member a selected distance. Furthermore, if a workpiece 16 exceeds the lower holding area, then the plurality of teeth 20 may be used to hold said unconventional workpiece 16, as illustrated in FIG. 1, whereby the user subtracts the predetermined length mentioned above to determine the desired measurement of the excessive workpiece 16.

It should be understood, of course, that the foregoing relates to exemplary embodiments of the invention and that modifications may be made without departing from the spirit and scope of the invention as set forth in the following claims.

What is claimed is:

1. A device, comprising:
   a base plate;
   a sidewall joined along a periphery of the base plate so as to define an upper and lower holding area;
   a curved opening provided by the base plate, wherein the curved opening communicates to the upper holding area, and wherein the curved opening is dimensioned to mimic the conventional bowed-shape of flexible tape; and
   a tongue element below the curved opening, wherein the tongue element is movable between a planar condition and a protruding condition away from the upper holding area, wherein a periphery of the curved opening is greater in the protruding condition.

2. The device of claim 1, further comprising two prongs provided by the base plate so as to extend along yet spaced apart from a substantial portion thereof, each prong eclipsing a separate portion of the curved opening.

3. The device of claim 2, further comprising a horizontal brace extending between the two prongs, wherein the horizontal brace provides a fastener hole.

4. The device of claim 1, further comprising a plurality of teeth provided along a portion of the sidewall.

5. A device, comprising:
   a base plate;
   a sidewall joined along a periphery of the base plate so as to define an upper and lower holding area;
   a curved opening provided by the base plate, wherein the curved opening communicates to the upper holding area, and wherein the curved opening is dimensioned to mimic the conventional bowed-shape of flexible tape;
   a tongue element below the curved opening, wherein the tongue element is movable between a planar condition and a protruding condition away from the upper holding area, wherein a periphery of the curved opening is greater in the protruding condition;
   two prongs provided by the base plate so as to extend along yet spaced apart from a substantial portion thereof, each prong eclipsing a separate portion of the curved opening;
   a horizontal brace extending between the two prongs, wherein the horizontal brace provides a fastener hole; and
   a plurality of teeth provided along a portion of the sidewall.

* * * * *